United States Patent [19]

Gunn

[11] Patent Number: 5,087,161
[45] Date of Patent: Feb. 11, 1992

[54] SPACED ELASTIC RING PRODUCT

[76] Inventor: Dennis R. Gunn, Tashiro-so east 1st Floor rm. 1 Kamiochiai 2-9-2, Shinjuku-ku Tokyo 161, Japan

[21] Appl. No.: 704,735

[22] Filed: May 20, 1991

Related U.S. Application Data

[63] Continuation of Ser. No. 92,146, Sep. 1, 1987, abandoned.

[30] Foreign Application Priority Data

Sep. 17, 1986 [JP] Japan .................. 61-141471[U]

[51] Int. Cl.$^5$ .............................................. F16B 37/10
[52] U.S. Cl. .................................... 411/433; 411/437
[58] Field of Search ............. 411/301, 433, 432, 437, 411/520, 521, 427, 546, 532, 512, 516, 517

[56] References Cited

U.S. PATENT DOCUMENTS

| | | | |
|---|---|---|---|
| 1,705,811 | 3/1929 | Eidel, Jr. .................. | 411/437 |
| 1,722,783 | 7/1929 | Basseches .................. | 411/437 |
| 2,016,088 | 10/1935 | Hargrave .................. | 411/402 |
| 2,227,648 | 1/1941 | Hufferd .................. | 411/437 X |
| 2,506,477 | 5/1950 | Warren, Jr. .................. | 411/301 X |
| 2,896,287 | 7/1959 | Stultz .................. | 411/521 X |
| 3,052,130 | 9/1962 | Kellogg et al. .................. | 411/437 X |
| 3,122,383 | 2/1964 | Hirsch .................. | 411/517 X |
| 4,236,561 | 12/1980 | Monticelli .................. | 411/280 |
| 4,531,872 | 7/1985 | Warkotsh .................. | 411/433 |
| 4,584,770 | 4/1986 | Sabol .................. | 411/301 X |

FOREIGN PATENT DOCUMENTS

| | | | |
|---|---|---|---|
| 615568 | 7/1935 | Fed. Rep. of Germany ...... | 411/427 |
| 880526 | 6/1953 | Fed. Rep. of Germany ...... | 411/433 |
| 2437756 | 3/1975 | Fed. Rep. of Germany ...... | 411/433 |
| 2723058 | 11/1978 | Fed. Rep. of Germany ...... | 411/437 |
| 3344240 | 6/1984 | Fed. Rep. of Germany ...... | 411/432 |
| 3429362 | 2/1986 | Fed. Rep. of Germany ...... | 411/432 |
| 59207 | 12/1967 | German Democratic Rep. ................................... | 411/433 |
| WO88/01024 | 2/1988 | PCT Int'l Appl. .................. | 411/427 |
| 281830 | 7/1952 | Switzerland .................. | 411/433 |
| 0812996 | 3/1981 | U.S.S.R. .................. | 411/433 |
| 145943 | 7/1920 | United Kingdom .................. | 411/427 |
| 547032 | 8/1942 | United Kingdom .................. | 411/427 |
| 767882 | 2/1957 | United Kingdom .................. | 411/437 |

OTHER PUBLICATIONS

Goodheart-Wilcox Automotive Encyclopedia, p. 12, Ochiai Fastener Company, 1984 Catalog.

Primary Examiner—Lloyd A. Gall
Attorney, Agent, or Firm—Ronald P. Kananen

[57] ABSTRACT

An essentially ring shaped member such as a stop ring is formed of an elastic material and has a gap at one section thereof. A removable spacer having a handle is disposed in the gap so as to expand the diameter of the ring shaped member. Removal of the spacer causes the elastic member to resiliently return to a condition in which its diameter is decreased. This arrangement facilitates fast and easy installation of the ring shaped member into an annular or in some cases helical groove formed in a cylindrical member.

23 Claims, 5 Drawing Sheets

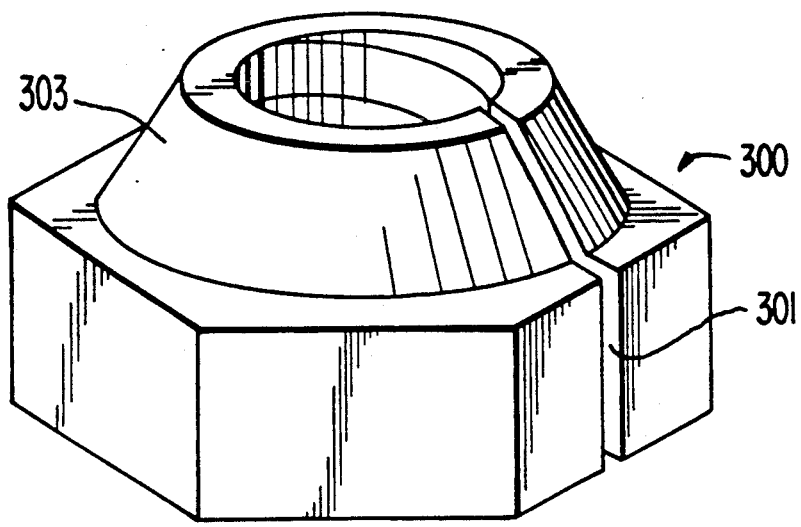
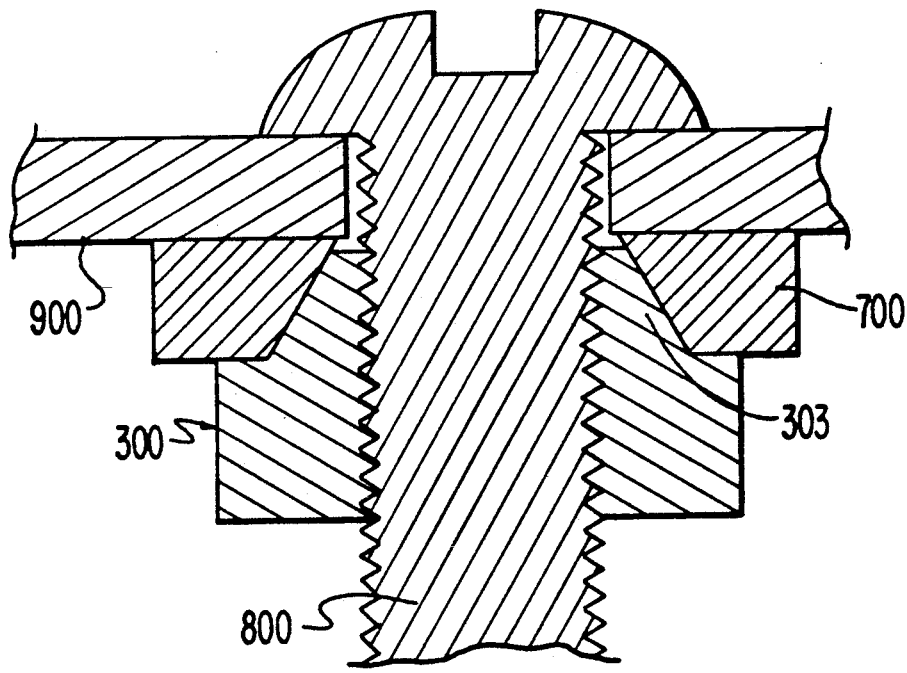

SPACED ELASTIC RING PRODUCT

This application is a continuation of application Ser. No. 07/092,146 filed Sept. 1, 1987, now abandoned.

This invention relates to an elastic ring product and more specifically to a stop ring or a threaded nut provided with a removable spacer so that it may be installed easily.

BACKGROUND OF THE INVENTION

In many industrial applications an elastic ring member such as piston ring or a stop ring which can be fitted into an annular groove of a cylindrical or rod shaped member is necessary. Generally, since the outer diameter of the cylindrical or rod shaped member is greater than the inner diameter of the elastic ring member in its undistorted state, in order to install this type of elastic ring member it must be opened by means of a special tool which is inserted into a gap, or into a pair of specially provided holes formed on either side of the gap, which is formed in a section of the ring shaped member, and held in this expanded condition while the rod member or piston having the annular groove into which the elastic ring member is to be received is inserted into the central hole of the ring member and the ring member is moved to a position of the rod member at which the annular groove is formed. The elastic ring member is then released by the tool and its resilience causes it to contract into the annular groove.

This process has some inconveniences however in that the special tool is required and when installing a great number of the elastic ring members is required, such as in the case of an assembly line, a working must fit the tool into the gap, or into the pair of specially provided holes, of each elastic ring he installs. This is time consuming. Furthermore, if the user accidentally applies too much pressure and expands the ring to far, he runs the risk of permanently deforming or causing the stop ring to become "sprung".

SUMMARY OF THE INVENTION

Therefore it is an object of the present invention to provide an elastic ring product which can be installed more quickly.

It is another object of the present invention to provide an elastic ring product which can be installed without tools.

It is another object of the invention to provide an elastic ring product in which the risk of damage to the ring during installation is minimized.

It is yet another object of an embodiment of the present invention to provide an elastic ring product of a novel type which may be installed on a bolt and function as a nut or, in another embodiment, as a locking nut.

The above stated objects can be accomplished by providing an elastic ring member with a disposable elastic spacer inserted into a gap thereof for holding the elastic ring member open until installed. The spacer may be provided with a handle so that it can be easily removed from the gap in the ring member. The handle provides an additional advantage in that it may be used to hold the ring member while it is being aligned with annular groove or screw threads into which it is to be fitted. The thickness of the spacer can be calculated by the manufacturer according to the elasticity of the elastic ring so that the elastic ring or nut may be opened by the spacer to the maximum possible diameter without causing it to become permanently distorted. Thus, damage due to over-stressing of the elastic ring during installations can be prevented.

DESCRIPTION OF THE DRAWINGS

FIG. 7 is a perspective view of the nut according to the third embodiment of the invention.

FIG. 8 is a sectional view of the third embodiment of the invention disposed on a nut in cooperation with a washer.

DETAILED DESCRIPTION OF THE INVENTION

Figure 1:
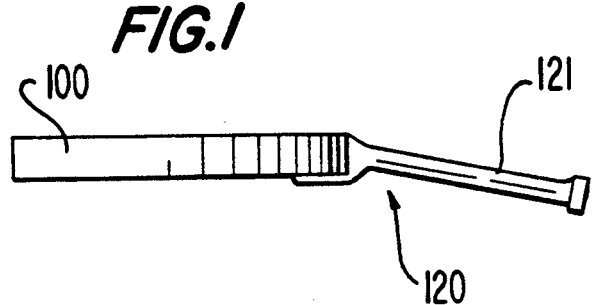
FIG. 1 is a side elevation of the first embodiment of the invention with the spacer disposed in the gap.
Figure 2:
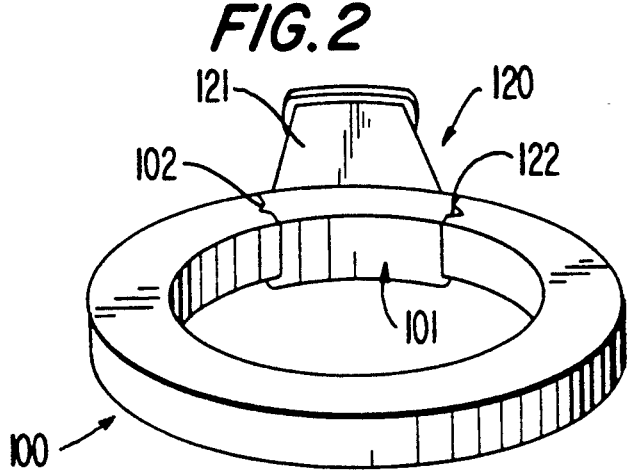
FIG. 2 is a perspective view of the first embodiment of the invention with the spacer disposed in the gap.
Figure 3:
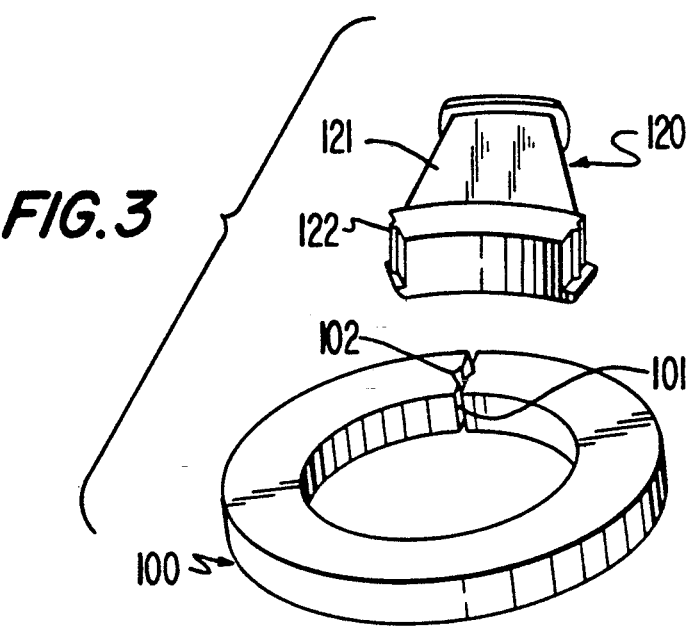
FIG. 3 is a perspective view of the first embodiment of the invention in which the spacer is depicted as having been removed from the gap and the ring member in a non elastically distorted condition.

In an elastic ring member 100 manufactured according to the present invention, a gap 101 is provided. When the elastic ring member 100 is in an undistorted condition, the inner edges of the gap 101 may be very close together or even meet. The ring member 100 may be formed in such a way that its circumference is not of uniform thickness; specifically, it may be thicker on the side opposite the gap 101, i.e. its central hole may be displaced in the direction of the gap 101 so that when it is opened, it flexes evenly and does not bend at just one circumferencial portion thereof. This type of elastic ring member is well known and is commonly referred to as a stop ring.

A spacer 120 is disposed in the gap 101. The spacer 120 is provided with a handle 121. The spacer 120 holds the facing surfaces defining the edges of the gap 101 apart. While the spacer is disposed within the gap 101 of the ring member 100, the upper surface thereof is flush with the upper surface of the ring member 100 and is held in the gap 101 by the resilient force of the ring member 100.

The ring member 100 may be provided with a notch 102 or notches 102 formed in the edge surfaces of the gap and the spacer 120 may be provided with a small protrusion 122 (or protrusions 122) for mating with the notch 102 (notches 102) so as to help keep the spacer 120 from coming out of the gap 101; however this is not necessary to the invention.

The inner diameter of the elastic ring member 100 is caused to become larger according to the amount that the spacer 120 alters the distance between the facing surfaces of the gap 101. For example, if the inner edges of the gap 101 meet when the elastic ring member 100 is in an undistorted state and the inner diameter of the elastic ring member 100 is 5" then by inserting a spacer 120 whose thickness is roughly 3.14' the inner diameter of the elastic ring member 100 may be elastically expanded to 6". Removal of the spacer 120 causes the elastic ring member 100 to resiliently return to its undistorted state in which the inner diameter thereof is 5". Thus the above described elastic ring member 100 may be fitted into an annular groove in a rod member (not shown) whose diameter is 6" by inserting the rod through the elastic ring member 100 while the spacer 120 is disposed within the gap, moving the elastic ring member 100 to the portion of the rod at which the annular groove is formed, and then removing the spacer 120 causing the ring member 100 to resiliently contract into the annular groove.

It will be appreciated that the above operation can be performed considerably faster than by the methods of the prior art. Further, the handle 121 of the spacer 120 can be formed so as to easily facilitate operations that would be difficult by prior art methods. For example if the handle 121 is formed with a rod or filament section, the ring member 100 can be installed in a "tight" workspace, in which the spreading tool of the prior art would be too bulky to operate, while being grasped by means of the handle 120 of the spacer 100, which may be of any length deemed to be convenient.

Figure 4:
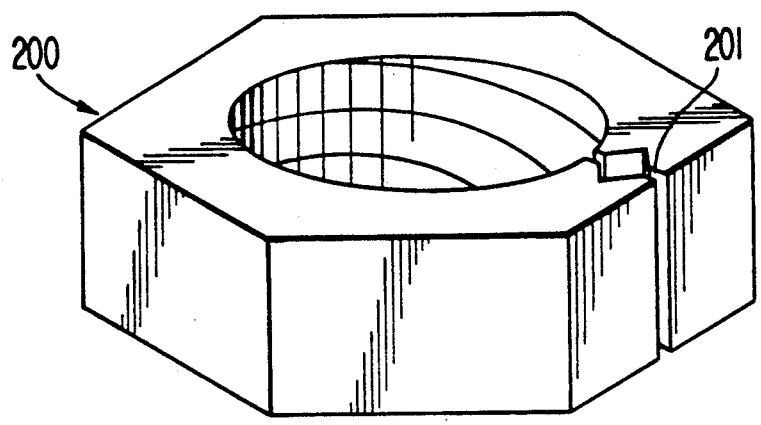
FIG. 4 is a perspective view of a nut according to the second embodiment of the invention.
Figure 5:
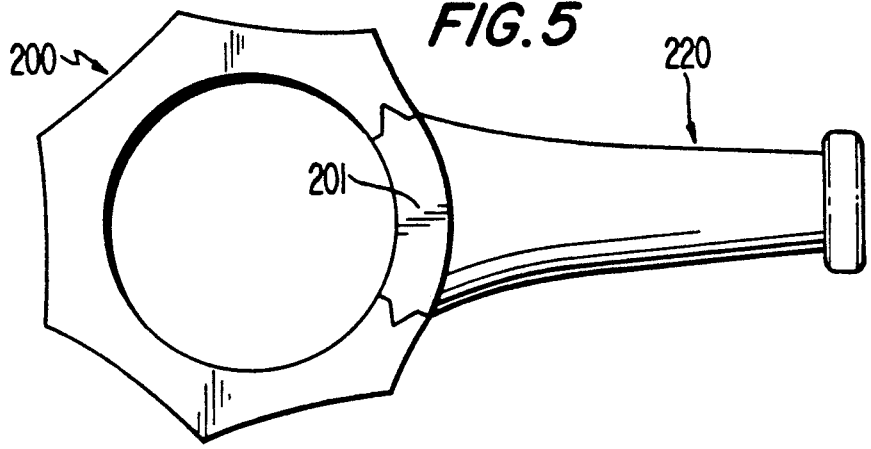
FIG. 5 is a top view of the second embodiment of the invention wherein the spacer is disposed in the gap thereof and the nut is in an elastically expanded condition.

In a second embodiment depicted in FIGS. 4 through 6, an elastic ring 200 takes the form of a nut 200 with a gap 201 formed on one side thereof and a spacer 220, essentially similar in function to the one 120 described in connection with the first embodiment disposed in the gap 101. Like a conventional nut, it is formed with a threaded hole through its center and its outer periphery is hexagonal so as to allow it to be tightened onto a bolt with a wrench or pliers while it is in its undistorted shape.

As in the previous embodiment, while the spacer 220 is disposed within the gap 201, the diameter of the threaded hole is increased; therefore, the threads of the nut will not positively engage with the threads of a bolt of a given size to cause the nut to be restricted to any part of the threaded section thereof. Therefore, while the spacer 220 is in the gap 201, the nut 200 can be moved along the length of the threaded section of a bolt without being turned or screwed. When the nut 200 reaches a desired section of the bolt, the spacer 220 can be removed thereby causing the nut 200 to elastically return to its undistorted shape therefore causing the diameter of the threaded hole to decrease so that the threads of the nut 200 can positively engage those of the bolt whereby it can be tightened into place by conventional means such as pliers or a wrench.

It will be appreciated that this embodiment could be used to advantage over conventional nuts in the following example situations: when a section of a bolt is bent or the threads thereof are otherwise damaged so as to prevent a conventional nut from being threaded past said damaged section; for use on very long bolts or threaded stock where threading a conventional nut over a long section of the bolt is troublesome and time consuming; or in difficult working environments such as under sea or in outer space where applying torque to a nut is difficult.

In a slight variation on the second embodiment the nut is so formed that when it is in its undistorted condition, the interior diameter of the threaded hole is smaller than that diameter necessary to accommodate the threaded section of the bolt. Therefore, when the nut is threaded onto the bolt, the central hole thereof is must be elastically expanded to accommodate the threaded section of the bolt. This has the effect of causing the nut to elastically exert a squeezing pressure on the threaded section of the bolt. This causes the amount of friction between the threads of the bolt and those of the nut to be increased, which has the effect of making the nut difficult to turn and therefore not subject to loosening due to influences such as vibration or the like.

In another variation of the second embodiment, the spacer is large enough to prevent the latter nut described above from exerting squeezing pressure on the threaded section of the bolt but is not large enough to prevent the threads of the nut from mating with those of the bolt. Therefore, the nut can be easily screwed to the desired position on the bolt while the spacer is in place. Then, when the nut member is at or near the desired position, the spacer can be removed causing the nut to elastically squeeze onto the threaded section of the bolt. While the nut is in this condition, it is not subject to loosening or moving due to vibration but can be tightened into place or loosened by conventional means such as a wrench or pliers.

In still another variation, (not shown), the spacer is provided with two sections each of a different thickness.

The sections are arranged in such a way that when the spacer is in a first position, fully inserted into the nut, the inner diameter of the nut is great enough to allow the nut to be moved freely along the threaded section of the bolt without being threaded thereon. When the spacer is in a second position partially removed from the gap in the nut, the threaded center hole of the nut becomes small enough to allow the threads of the nut to mate with those of the bolt but still allow the nut to rotate freely on the threaded section of the bolt.

As described above when the spacer is removed completely the nut becomes squeezed onto the bolt by its own elasticity.

In a third embodiment depicted in FIGS. 7 and 8 the ring member, again as in the second embodiment, takes the form of a nut 300 with a slit or gap cut in one side thereof for accommodating therein a spacer that is essentially the same as that of the second embodiment; however, in the ring member 300 according to the third embodiment, a frustal section 303 protrudes at the upper side of the ring member.

Since the spacer is essentially the same in principle as that of the second and first embodiments only the nut is illustrated.

The frustal section 303 is designed to be received in the central hole of a washer 700.

It is preferably but not a necessary precondition of the invention that the washer 700 has a tapered central hole and that the washer is thicker than the length of the upwardly protruding frustal section 303 of the nut 300 and that the inner diameter of the center hole in the washer at the bottom side of the washer is greater than the outer diameter of the top of the frustal section 303 of the nut 300 but is smaller than the outer diameter of the bottom of the frustal section 303 at the top of the nut 300.

If the above conditions are satisfied, after the spacer has been removed from the nut 300 and the nut 300 is disposed on a threaded section of a bolt 800 with the above described washer 700 disposed between the frustal section 303 of the nut 300 and a surface 900 against which the nut 300 is to be tightened, tightening, of the nut 300 will cause the frustal section 303 of the nut 300 to become wedged into the central hole of the washer 700. The more tightly the frustal section 303 of the nut 300 becomes wedged into the washer 700, the more constricted the central hole of the nut 300 becomes and therefore the more tightly it becomes wedged onto the threads of the bolt 800. Thus the invention provides a locking nut which may easily fitted in place.

Further, it should be noted that while in the prior art a type of nut exists which has a frustal section on its top side that is designed to be constricted by the central hole of a washer, in the prior art slits are formed only in the frustal section of the nut and it does not as in the present invention have a slit completely bisecting one side, including the lower section, of the nut. Because of this arrangement, in the prior art nut, the constricting pressure of the frustal section is concentrated at a relatively small portion of the bolt. This can tend to damage bolts made of relatively soft material. In the present invention since the slit passes through the entire side of the nut including the frustal section, the pressure of nut on the bolt is more evenly distributed over the section of the bolt occupied by the nut.

Figure 9:
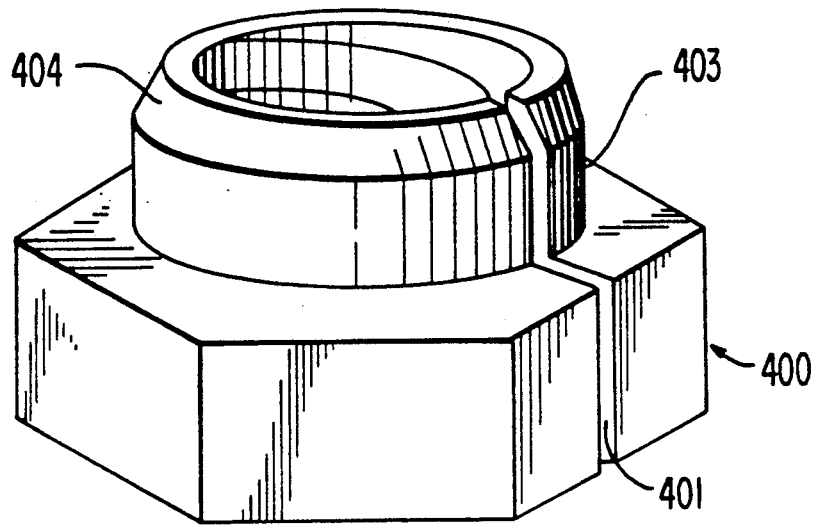
FIG. 9 is a perspective view of a nut according to the fourth embodiment of the invention.
Figure 10:
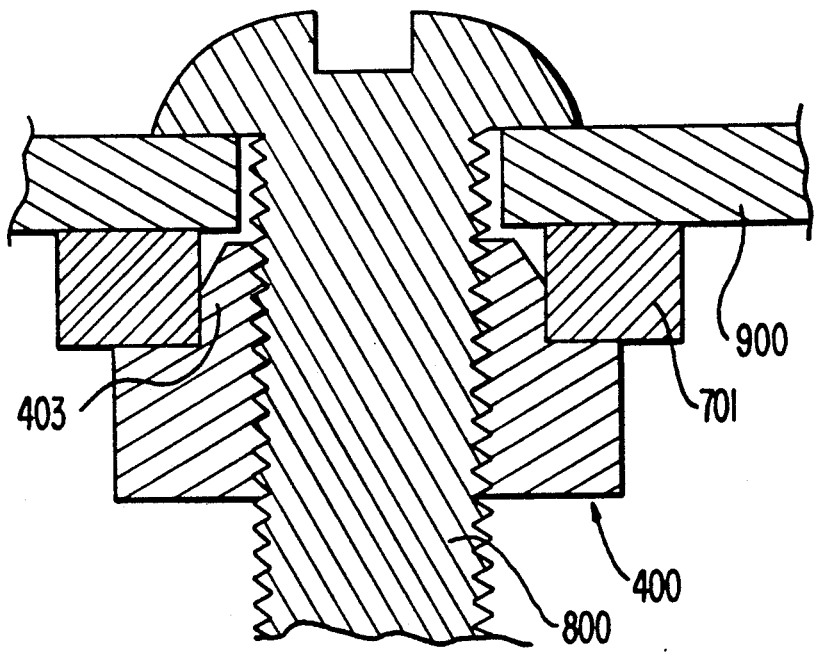
FIG. 10 is a sectional view of the fourth embodiment of the invention disposed on a nut in cooperation with a washer.

FIGS. 9 and 10 illustrate a nut according to a fourth embodiment of the present invention where the nut 400 is essentially similar to that of the third embodiment except that the upwardly protruding section 403 is essentially cylindrical although it may be provided with a small frustal section at the top thereof. With this arrangement the cylindrical section 403 can be caused to cooperate with an essentially normal washer 701 of very slightly larger inside diameter than outside diameter of the cylindrical section 403 to prevent the nut 400 from expanding, when tightened against a surface 900, due to the wedge effect occurring between the threads of the nut 400 and the threads of the bolt 800.

The small frustal section 404 may be provided to help guide the washer 701 over the cylindrical section 403 of the nut, 400 or the frustal 404 section may be used to cooperate the nut 400 with a washer in the manner set forth in connection with the second embodiment. Provision of the frustal section however is optional.

Figure 11:
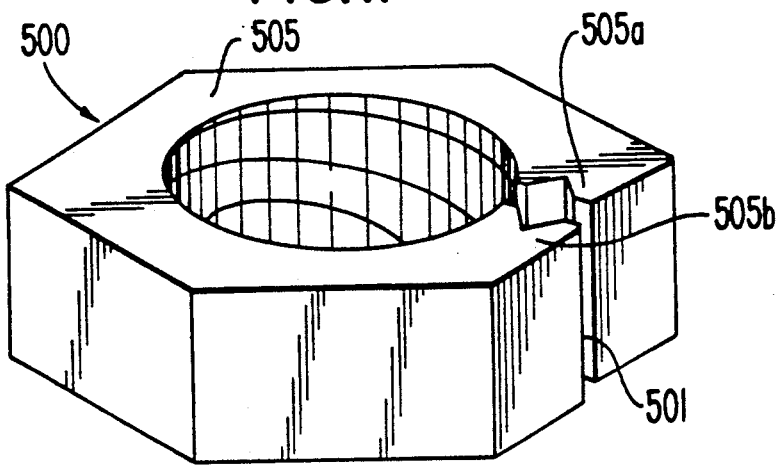
FIG. 11 is a perspective view of a nut according to the fifth embodiment of the invention.

In a fifth embodiment the invention shown in FIG. 11 the invention again takes the form of a nut with a slit cut in one side. In the fifth embodiment the upper surface 505 of the nut when the nut is in its undistorted state, is uneven. Specifically, on one side of the slit the surface 505a is slightly higher than that 505b on the other side of the slit therefore when the nut 500 is tightened against a surface which is flat, such as a washer, pressure is exerted on the upper surface of the nut on only one side 505a of the groove 501 and therefore tends to become concentrated on only a small section of the threads of the bolt. This increases the friction between the nut 500 and a bolt (not shown) and causes movement of the nut 500 to be restricted when it is tightened against a surface. This has the effect of causing the nut 500 to be less subject to loosening due to vibration. If the pressure on the upper surface of the nut 500 is sufficient it can cause the nut 500 to become distorted in such a way that the thread sections on the interior of the nut 500 become misaligned and whereby cause slight damage to the threads of the bolt which in turn helps the nut to become more firmly locked at one position on the bolt.

It will be appreciated that, as in the first embodiment, the second through fifth embodiments in order to have the ring member (the nut) bend evenly when opened it may be desirable to slightly displace the central threaded hole of the nut in the direction of the gap. It will also be appreciated by those skilled in the art that any one or a combination of a number of expedients, such as for example grooves cut in the nut or forming the nut of pressed sheet metal, for causing the ring member to flex or expand in a desirable manner may be employed without departing from the principle of the invention.

Figure 12:
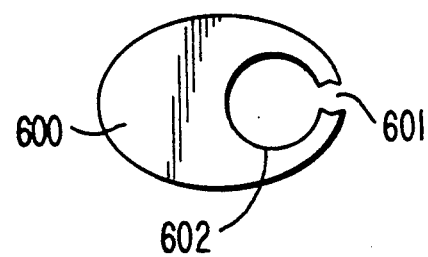
FIG. 12 is a plan view of the ring member according to the sixth embodiment of the invention depicted with the spacer removed.

In a sixth embodiment of the invention depicted in FIG. 12 the outer periphery of the nut 600 is oval for cooperation with a known oval wrench (not shown). As in the previous embodiments a gap 601 is formed at a portion of the oval nut in which a spacer may be inserted for holding the nut in an elastically expanded state in which the threaded hole 602 is enlarged. As also disclosed above in connection with previous embodiments, the threaded hole 602 in the nut may be placed off center so as to allow the hole to form a near circle when the gap 601 is spread open by the spacer. The spacer and its function are essentially similar in all respects to the one (22) disclosed above in connection with the second embodiment and therefore redundant disclosure and illustration thereof will be omitted.

Figure 6:
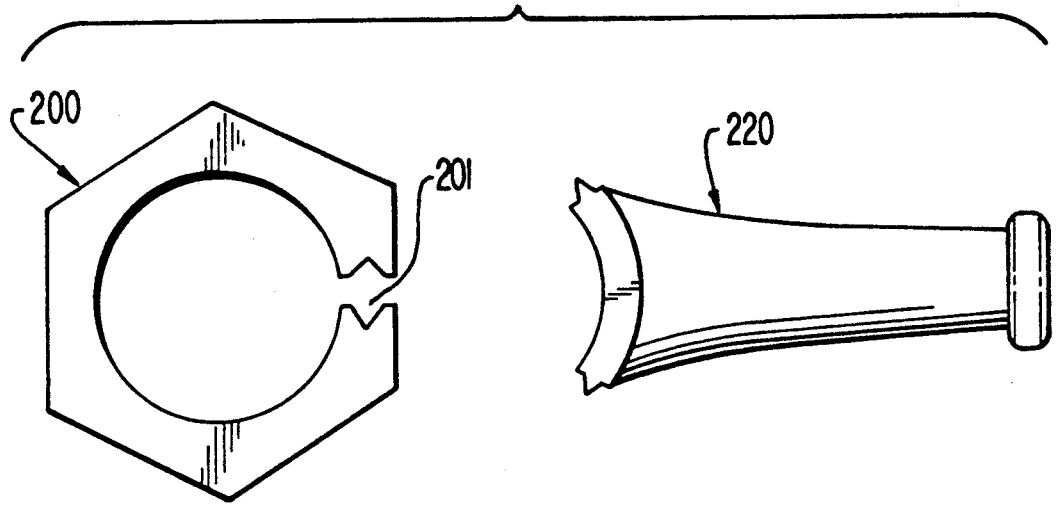
FIG. 6 is a top view of the second embodiment of the invention wherein the spacer is depicted as having been removed from the gap thereof and the nut is in a non-elastically expanded condition.
Figure 13:
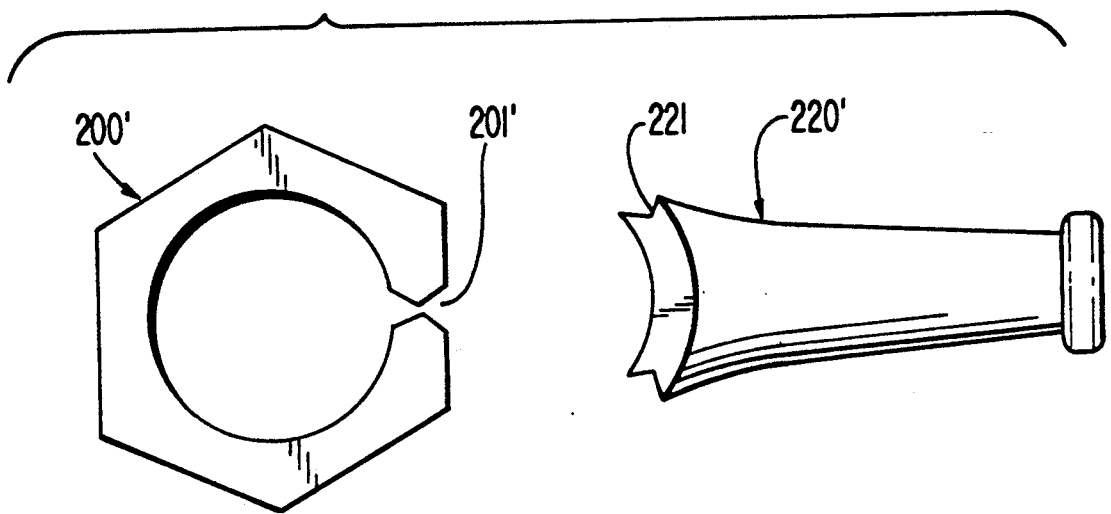
FIG. 13 is a view similar to FIG. 6 showing a protrusion in the gap for cooperation with a notch on the spacer.

FIG. 13 is a view similar to FIG. 6 wherein the removable spacer 220' is provided with a notch 221 for cooperation with a protrusion formed on a surface of the gap 201' in the ring 200' to hold the removable spacer 220' in the gap 201'.

It will also be appreciated by those skilled in the art that the handle of the spacer may take on any length or shape deemed to be convenient or to facilitate easy removal of the spacer from the gap.

It will also be appreciated by ones skilled in the art that numerous variations on, or recombinations of the elements of, the above described embodiments and species of the invention may be embodied without departing from the principles of the invention.

What I claim is:

1. A spaced elastic ring product comprising:
   a removable spacer;
   a handle formed on said removable spacer for facilitating manual removal of said spacer without rotation thereof; and
   an elastic ring means, comprising a gap at a portion thereof for said spacer, for defining a hole of a second larger diameter while said spacer is disposed in said gap and elastically returning toward a condition wherein said hole is of a first smaller diameter when said removable spacer is removed from said gap.

2. A spaced elastic ring product comprising:
   an elastic ring member for defining a hole having a first diameter while said elastic ring is in a first, undistorted, condition;

a gap means defined at a portion of said ring member for defining a gap of a first width while said ring member is in said first condition;

a removable spacer removably disposed in said gap for holding said elastic ring member in a second condition wherein the diameter of said hole is increased to a second diameter which is greater than said first diameter and said gap width is increased to a second width which is greater than said first width while said spacer is disposed in said gap, and for being removed to allow said ring member to return to said first condition; and a handle provided on said spacer for facilitating manual removal of said spacer by drawing said handle without rotating said spacer.

3. A spaced elastic ring product comprising:

a removable spacer, said removable spacer being completely removable from said spaced elastic ring product;

a handle formed on said removable spacer for facilitating manual removal of said spacer; and an elastic ring means comprising a gap, for resiliently defining a hole which is of a first diameter while said removable spacer is removed from said gap, and of a second greater diameter while said spacer is in said gap.

4. An elastic nut for threaded cooperation with a threaded bolt of a predetermined diameter, comprising:

an elastic ring member defining a central axis, a through opening in said ring member extending generally parallel to said central axis, a thread around said through opening, and a gap through a sector of said ring member, said elastic ring member having an undistorted condition in which said thread prevents relative axial movement between said elastic ring member and the threaded bolt without relative rotation therebetween;

a spacer disposed in said gap and in contact with portions of said elastic ring member on opposite sides of said gap, said elastic ring member being deformed by said spacer to an elastically distorted condition in which said elastic ring member can be moved axially along said threaded bolt without relative rotation therebetween;

means for retaining said spacer in said gap in the elastically distorted condition of said elastic ring member and in contact with said portions of said ring member on opposite sides of said gap; and means for removing said spacer completely from said gap without rotation of said spacer with respect to said elastic ring member, said removing means comprising a handle on said spacer.

5. An elastic nut formed with a gap at a section thereof comprising: a removable spacer means for expanding the diameter of said nut while said spacer means is disposed in said gap and removal of said spacer means causing said diameter to decrease, a handle formed on said spacer means for facilitating manual removal of said spacer means, said spacer means being retained in said gap so as to be removable by drawing said handle without rotating said spacer means relative to said elastic nut, and a frustal section protruding from a surface of said nut that is normal to the axis thereof and bisected by said gap wherein forcing of said frustal section into a hole of smaller diameter than said frustal section causes the width of said gap to decrease for causing the interior diameter of said nut to decrease.

6. An elastic nut formed with a gap at a section thereof, in which gap a removable spacer means is disposed for expanding the diameter of said nut while said spacer means is disposed in said gap and removal of said spacer means causing said diameter to decrease, a handle formed on said spacer means for facilitating manual removal of said spacer means, said handle being operable for being drawn without being rotated for removing said spaced means for said gap, and a cylindrical section protruding from a surface of said nut that is normal to the axis thereof and bisected by said gap wherein insertion of said cylindrical section into a hole of slightly larger diameter than said cylindrical section prevents the width of said gap from increasing for preventing the interior diameter of said nut from increasing.

7. An elastic nut formed with a gap at a section thereof, in which gap a removable spacer, comprising a handle for facilitating manual removal thereof, is provided for expanding the diameter of said nut while said spacer is disposed in said gap and removal of said spacer causing said diameter to decrease, and a threaded hole which, when said nut is not elastically distorted, is not large enough to accommodate a threaded bolt of a given size and which can be elastically distorted to accommodate said bolt of a given size, said spacer being completely removable from said gap by pulling said handle without rotating said spacer with respect to said elastic nut.

8. An elastic nut provided with a removable spacer as set forth in claim 7 wherein said spacer holds said elastic nut in a condition in which the interior diameter is large enough to allow said nut to be threaded onto said bolt of a given size.

9. An elastic nut provided with a removable spacer as set forth in claim 7 wherein said spacer holds said elastic nut in a condition in which the interior diameter is large enough to allow said nut to be moved over the threads of said bolt of a given size without being threaded thereonto.

10. An elastic nut as set forth in claim 7 wherein said nut is provided with a plurality of parallel planar surfaces arranged around the circumference thereof.

11. An elastic nut as set forth in claim 10 wherein said nut is a hexagonal nut.

12. An elastic nut as set forth in claim 7 wherein said nut is an oval nut.

13. An elastic nut as set forth in claim 7 wherein said threaded hole is offcenter relative to the circumference of the nut and is displaced in the direction of the gap.

14. An elastic nut as set forth in claim 7 wherein a surface of said elastic nut adjacent said gap is higher on one side of said gap than on the other side.

15. A spaced elastic ring product comprising:

an elastic ring member formed with a gap at a section thereof, widening of said gap causes the interior diameter of said ring member to increase;

a removable spacer removably disposed in said gap for spreading said gap so as to hold said elastic ring member in a condition in which said gap is widened and removal of said spacer causes said ring member to resiliently return to a condition in which said gap is small thereby decreasing the interior diameter of said ring member, said removable spacer being non-rotatable with respect to said elastic ring member; and a handle formed on said removable spacer for facilitating manual removal of said spacer from said gap, said removable spacer being removable from said gap by drawing said handle without rotation.

16. An elastic ring product as set forth in claim 15 wherein the inner periphery is formed with a thread.

17. An elastic ring product as set forth in claim 16 wherein the outer periphery is hexagonal.

18. An elastic ring product as set forth in claim 17 wherein a frustal section is formed on a surface of the ring member that is normal to the axis of the central hole thereof.

19. An elastic ring product as set forth in claim 16 wherein the outer periphery is oval shaped.

20. An elastic ring product as set forth in claim 15 wherein the central hole of said ring member is offset.

21. An elastic ring product as set forth in claim 16 wherein the central hole of said ring member is offset.

22. An elastic ring product as set forth in claim 15 wherein said removable spacer is provided with a protrusion for cooperation with a notch formed in a surface of said gap to hold said removable spacer in said gap.

23. An elastic ring product as set forth in claim 15 wherein said removable spacer is provided with a notch for cooperation with a protrusion formed in a surface of said gap to hold said removable spacer in said gap.

* * * * *